Sept. 29, 1953  G. A. JOHNSON  2,653,516
LIGHT-BEAM-RECTIFYING LENS
Filed Oct. 17, 1949  2 Sheets-Sheet 1

INVENTOR.
GLEN A. JOHNSON,
BY: Harold B. Hood
ATTORNEY.

Sept. 29, 1953 G. A. JOHNSON 2,653,516
LIGHT-BEAM-RECTIFYING LENS
Filed Oct. 17, 1949 2 Sheets-Sheet 2

INVENTOR.
GLEN A. JOHNSON,
BY: Harold B. Hood.
ATTORNEY.

Patented Sept. 29, 1953

2,653,516

UNITED STATES PATENT OFFICE 2,653,516

LIGHT-BEAM-RECTIFYING LENS

Glen A. Johnson, Connersville, Ind.

Application October 17, 1949, Serial No. 121,845

6 Claims. (Cl. 88—57)

The present invention relates to a beam-rectifying lens. The primary object of the invention is to produce a lens which, when light is passed therethrough from a suitable source, will break up that light into a cluster of substantially parallel beams, reflecting or absorbing fragments of the original beam which tend to depart from the optimum direction, and substantially eliminating from the light flowing beyond the lens any beams departing from the desired parallelism.

Alternately, I may find it desirable to permit light, of reduced intensity, to depart angularly, to a desired degree, from such parallelism.

I accomplish this purpose by producing a lens made up of tralucent sections of substantial length in the intended direction of light flow, such sections being defined by substantially opaque, light-obstructing surfaces, which may be reflective or absorptive, having a dimension, in that same direction, substantially equal to the length of the tralucent sections, said opaque sections being minutely spaced apart in directions transverse to the intended direction of light flow, and having dimensions, in such transverse direction, so tiny, even with relation to the corresponding dimensions of the minute tralucent sections, as to be insubstantial. These opaque surfaces are so arranged that any line in any one of such surfaces defining an individual tralucent section and meeting a face of the lens in any predetermined angle, will be substantially parallel with every line lying in another of such surfaces and meeting such lens face in that same angle.

As a result of this construction, and of the fact that the tralucent sections and the opaque surfaces are of substantial extent in the direction of intended light flow, but minute or insubstantial in directions transverse to that first-named direction, at least a major portion of light flowing through the lens will be effectively rectified, that is, it will be broken into a bundle of rays of minute cross section, said rays proceeding in parallel lines after passage through the lens, substantially without deviation from such parallelism.

It may be found desirable to permit the escape of light, at substantially reduced intensity, through some or all of the surfaces defining the boundaries of some or all of the tralucent sections. Thus, if my improved lens is used in automobile head-lamps, complete rectification of the light from the headlamp sources might render such headlamps entirely invisible to the operator of a meeting vehicle as the two vehicles closely approach each other. For this reason, the word "opaque" and its variants is used throughout the present specification and the appended claims to refer to a quality of substantial light-obstruction varying from complete interruption to a partial translucence, but not extending to substantial transparency.

A further object of the invention is to provide, in any one of several ways, a lens of the character above described in which the tralucent sections are much smaller in cross sectional dimension, and the defining surfaces are much thinner, than would be possible by casting any tralucent material upon and within a self-sustaining grid of any known material.

A further object of the invention is to provide a lens of the character described by photographically producing a grid of reflective or light-absorptive characteristics substantially completely or partially penetrating a plate of photo-sensitive glass, by exposing such plate to light flowing, from a relatively distant source, through a screen consisting of very fine lines of transparency drawn or otherwise produced upon an otherwise-opaque film, plate, or the like located closely adjacent such plate of photo-sensitive glass and in the path of light falling upon such plate of photo-sensitive glass from such source, and then treating such plate of photo-sensitive glass to cause the development therein of opaque regions corresponding to such lines, the result of such development being to extend such opaque regions in said plate of glass from one face of said plate to any desired degree toward the opposite face of said plate.

A further object of the invention is to provide a light-rectifying lens by taking a plate of tralucent material, having a multitude of posts of minute cross sectional areas projecting from one face thereof, rendering the lateral surfaces of such posts opaque, taking another plate of tralucent material having similar posts projecting from one face thereof, rendering the lateral surfaces of said posts opaque, and assembling said plates with their respective posts in interdigitating relation, and securing such plates in such relation.

Further objects of the invention will appear as the description proceeds.

To the accomplishment of the above and related objects, my invention may be embodied in the forms illustrated in the accompanying drawings and in the steps disclosed herein, attention being called to the fact, however, that the drawings are illustrative only, and that change may be made in the specific construction and the specific procedure illustrated and described, so long as the scope of the appended claims is not violated.

Figure 1:
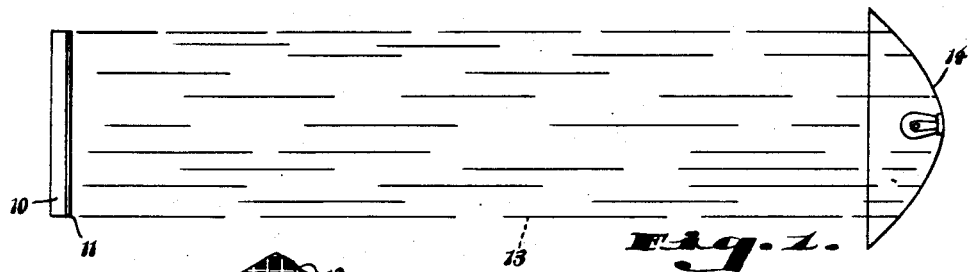
Fig. 1 is a diagrammatic view illustrating the manner in which a plate of photo-sensitive glass may be exposed, through a suitable screen, to light from a remote source for producing a grid of opaque surfaces extending through the body of such plate.
Figure 2:
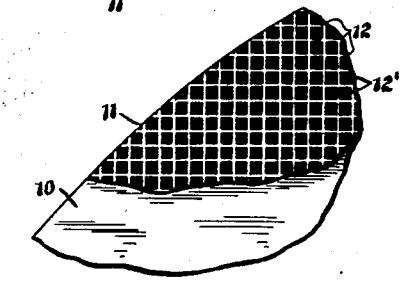
Fig. 2 is a fragmental elevation showing a suitable screen assembled with a plate of photo-sensitive glass, for such exposure, and drawn to an enlarged scale.
Figure 3:
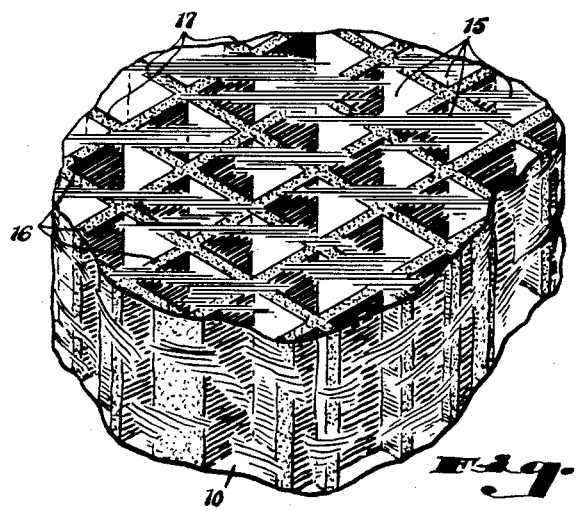
Fig. 3 is a perspective view, diagrammatic in character and drawn to a highly magnified scale, showing a fragment of a completed lens produced in accordance with the suggestion of Fig. 1.

Referring more particularly to Figs. 1 to 3, it will be seen that I have shown a plate 10 of photo-sensitive glass against one face of which is placed a screen 11. Such screen may preferably take the form of a generally opaque film or plate upon which has been produced, in any suitable fashion, a network of very closely spaced, very fine tralucent lines 12. In the illustrated form of the invention, the lines 12 comprise two series of parallel lines intersecting each other at 90°, but it will be entirely apparent that any other suitable arrangement of lines which cooperate to define tiny opaque spots, may be used. Those spots 12' are of such character as to impede to a substantial extent the passage of light therethrough, and will preferably be completely opaque, while the lines 12 bounding or defining such spots 12' will be substantially tralucent.

Light, indicated at 13, will be caused to pass through the screen 11 to impinge upon the plate 10; and preferably the source 14 of such light will be relatively remote from the plate and screen in order to minimize the effect of the tendency of light rays to diverge. The distance between the screen and the light source should, under all circumstances, very greatly exceed the distance between the screen and the plate 10; and I presently prefer to mount the screen in direct contact with the adjacent face of the plate 10, and to locate the plate and screen assembly at least several feet from the light source 14.

Photo-sensitive glass, as developed and offered on the market by Corning Glass Company of Corning, New York, possesses the quality of responding to exposure to ultraviolet light in the 300 to 350 mu band, followed by controlled heating of the glass, by developing opaque regions in its body corresponding precisely to the regions exposed to such light. As the developing heat treatment is continued, the regions of opacity will continue to grow, from the exposed surface of the glass piece toward the surface of said piece remote therefrom, without divergence; and the developing treatment may, and in this instance should, be continued until such opaque regions meet such remote surface of the plate 10.

The glass to which I here refer, and the methods whereby it may be produced, are said to be disclosed in United States Patents Numbers 2,326,012, issued August 3, 1943, and 2,422,472, issued June 17, 1947; and in applications for United States patents Serial Numbers 513,443 filed December 8, 1943, 513,444 filed December 8, 1943, 513,445 filed December 8, 1943, 513,441 filed December 8, 1943, 695,801 filed September 9, 1946, and 695,802 filed September 9, 1946, now, respectively, U. S. Patents 2,515,937, 2,515,938, 2,515,939, 2,515,936, 2,515,940 and 2,515,941, all issued July 18, 1950. Briefly, the product is a clear, high quality glass which, when subjected to suitable photographic processes, reproduces permanently in the glass a photographic image with high fidelity. The unprocessed glass may be handled like any conventional glass so long as it is not excessively exposed to ultraviolet rays. A simple cover from sunlight normally provides effective protection.

Light exposure to produce the photographic image requires essentially parallel light in the 300 to 350 mu band of the ultraviolet region at high intensity, exposure time being dependent upon the power output of the ultraviolet in the required band and the distance of the glass from the light source. With, for instance, an output of 2400 microwatts per sq. cm. in the required band and at a distance of nine inches, average exposure time would be approximately ten minutes. Greater spacing, as suggested above, is desirable in order to improve the degree of parallelism of rays from the source falling on the screen and the glass.

After exposure, the glass is still clear and transparent. The latent image is developed by simple heat treatment. After heating the previously-exposed glass to approximately 550° C., somewhat above the annealing point, the image appears in the glass. Development time varies from five minutes to an hour, depending upon the glass composition and the desired effect. Depth of image penetration and color, within limits, can be controlled at will by varying exposure time and/or development time. Development may be carried out at any time after exposure, provided the glass is protected, meantime, against further ultraviolet exposure.

In Fig. 3, I have illustrated, upon a highly magnified scale, a fragment of a plate 10 which has been subjected to the exposure suggested in Figs. 1 and 2, and has subsequently been carried through the developing treatment. It will be seen that the body of the plate now comprises a multiplicity of tralucent sections 15 defined by substantially horizontal opaque regions 16 intersected by substantially vertical opaque regions 17. It will be seen, further, that the regions 16 and the regions 17 are minutely spaced apart and are of insubstantial transverse dimensions, and that the extent of each tralucent section 15 in the direction of thickness of the plate 10 is very substantially greater than the transverse dimensions of such sections. It will further be seen that, in the embodiment of the invention illustrated in Fig. 3, the surfaces defined by the regions 16 and 17 are normal to the opposite faces of the lens 10, and that any line in any one of such surfaces normal to a lens face is parallel with every line in any other one of said surfaces likewise normal to such lens face.

If, now, the completed lens 10 is used, for instance, as a lens for an automobile headlamp, light falling upon the inner face of the lens will be broken, by the opaque regions 16 and 17, into a bundle or cluster of rays. Any rays striking such inner face at acute angles will impinge upon an opaque surface of one of the regions 16 or 17, whereby it will be reflected or absorbed; and only rays which are parallel with the opaque surfaces defining the sections 15 will be permitted to penetrate, and flow forth from, the lens 10.

As stated above, these surfaces 16 and 17 may be utterly opaque, or they may have a lesser degree of opacity, permitting limited penetration by angularly-directed rays, so long as they have a substantial light-obstructing effect to accomplish the stated purposes of the present invention.

Figure 4:
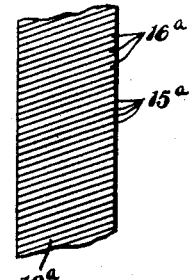
Fig. 4 is a fragmentary section through a modified form of lens, the spacing between opaque surfaces being exaggerated.

In Fig. 4, I have indicated a lens 10a in which the opaque regions 15a incline for instance downwardly from one face of the plate toward the other; but it will be noted that, of course, the surfaces defined by the regions 16a are parallel with each other, and lines lying in any opaque surface and meeting a face of the plate in the same angle, will all be parallel. Such a lens, if used, for instance, in an automobile headlamp, would deflect all of the light from the ordinary source downwardly, in a cluster of parallel rays. Alternatively, some of the surfaces 15a may be horizontal, while others are downwardly inclined at suitable and varying angles.

A plate of the character illustrated in Fig. 4 can be produced, of course, either by tilting the plate, relative to the screen, out of perpendicular relation to the light beam 13, or by moving the light source upwardly, relative to the plate and screen assembly, to cause the beam 13 to incline relative to that assembly.

Figure 5:
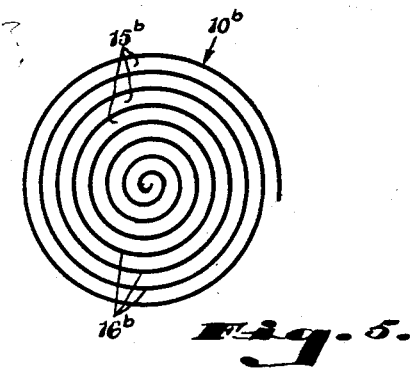
Fig. 5 is a front elevation of a fragment of a further modified form of rectifying lens, drawn to a highly magnified scale.

Fig. 5 illustrates, more or less diagrammatically, another possible arrangement of opaque surfaces in a generally tralucent plate 10b. Such surfaces 16b are arranged as a spiral, defining spiral tralucent sections 15b. Of course, both the thickness of the opaque regions 16b and the spacing between volutes of the spiral are drawn to a highly magnified scale.

Figure 6:
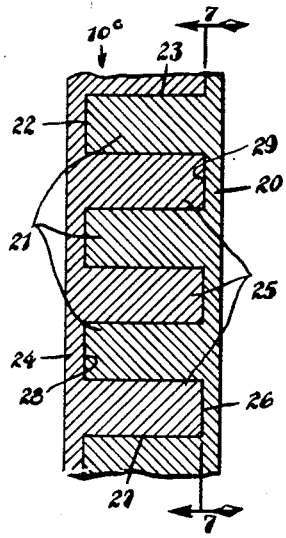
Fig. 6 is a section, drawn to a highly magnified scale, through a lens made up of matching plates.
Figure 7:
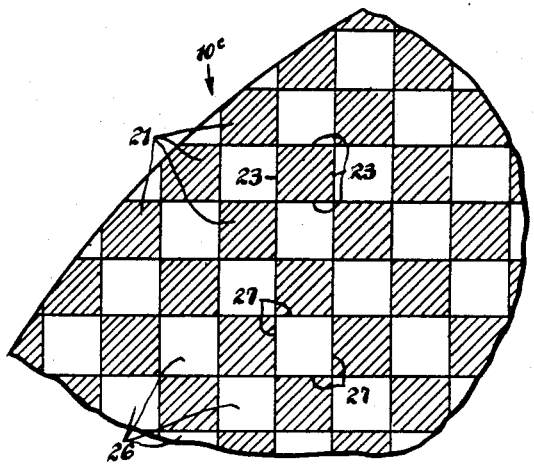
Fig. 7 is a fragmentary section taken substantially on the line 7, 7 of Fig. 6.

In Figs. 6 to 9, I have illustrated another form of lens capable of performing substantially the same function performed by the lens of Figs. 1 to 5, but produced in an entirely different manner. In Figs. 6 and 7 I show, drawn to a greatly magnified scale, a plate 20 having a plurality of posts 21 of minute cross section perpendicularly projecting from one face thereof, and preferably arranged in a checker board grouping over the whole surface of the plate 20. The plate 20 will be formed of any suitable tralucent moldable material, and preferably will be formed of one of the well known plastic substances which is capable of receiving an opaque coating or of absorbing, throughout a skin-like surface region, a suitable dye; and which is further capable of softening, under the effect of a known solvent, whereby it will be "plastic welded" to a contacting surface of an element of the same material. Representative specimens of such plastics are acrylic resins; representative specimens of such dyes are carbon black and other opaque and dense dyes currently known in commerce; and representative specimens of such solvents are hydrocarbon solvents, esters, and ketones.

Through suitable treatment with a dye of the character above mentioned, or with a coating of any suitable type capable of adhering to the posts 21, the lateral surfaces 23 of such posts are rendered opaque, while the free end surfaces 22 are left untreated. Thus, each post 21 will become a tralucent section of substantial dimension, in the direction of thickness of the plate 20, and defined by opaque surfaces perimetrally bounding the same.

A similar plate 24 is similarly provided with posts 25 projecting perpendicularly from one face thereof, in a similar checker board arrangement. The free ends 26 of said posts 25 are untreated, while the lateral surfaces 27 thereof are dyed or coated to render them opaque. Preferably, the axial length of the posts 25 will be equal to the axial length of the posts 21, and the posts of the two plates are so spaced and arranged that the posts 25 may be accurately interdigitated with the posts 21 in the arrangement illustrated in Fig. 7 to produce a composite lens 10c. In the form of invention illustrated in Figs. 6 and 7, each post 21 and 25 is in square cross section; and each lateral face of each post 21 is in engagement, throughout its length, with a lateral face of a post 25. The free end 22 of each post 21 engages the face of the plate 24 in a region 28 intermediate the bases of a group of posts 25; and similarly, the free end 26 of each post 25 engages a face of the plate 20 in a region 29 intermediate the bases of a group of posts 21. If the free end surfaces 22 of the posts 21 and the free end surfaces 26 of the posts 25 are treated with a suitable softening agent before the fingers 25 are interdigitated with the fingers 21, and if the plates are placed and held in the relationship shown in Fig. 6, so-called "plastic welding" will occur between said post ends and the associated plates. In many instances, the lateral surfaces of the posts will also be treated with the softening agent before interdigitation of the two series of posts to improve the solid weld between the plates.

Figure 8:
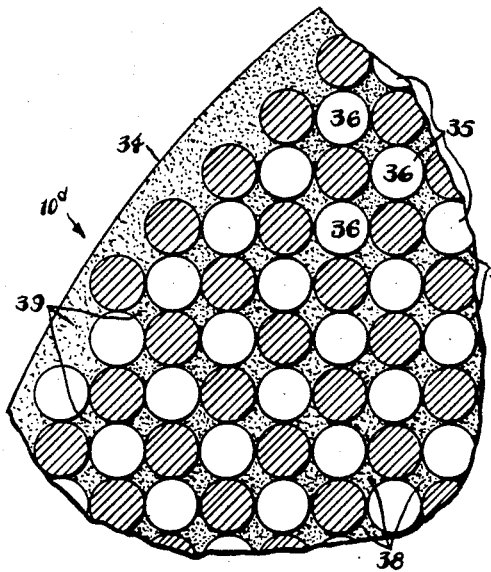
Fig. 8 is a section similar to Fig. 7 but showing a modified form of posts.
Figure 9:
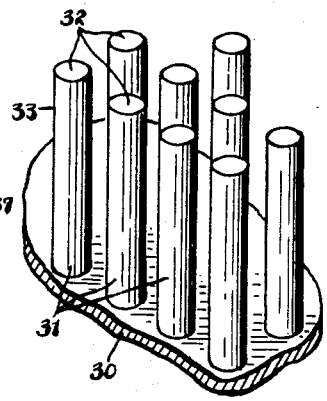
Fig. 9 is a fragmentary perspective view, drawn to an exaggerated scale, of a plate used in producing the lens of Fig. 8.

In Figs. 8 and 9, I have shown a lens 10d somewhat similarly produced, such lens comprising a plate 30 having a multitude of cylindrical posts 31 projecting therefrom in suitable arrangement, the free ends 32 of said posts being tralucent and the lateral surfaces 33 thereof being treated to render them opaque. A second plate 34 having a similar multitude of posts 35 projecting from one surface thereof is assembled with the plate 30, with its posts 35 interdigitated with the posts 31 of the plate 30. As in the embodiment of the invention illustrated in Figs. 6 and 7, the free ends 32 and 36 of the two series of posts will be preliminarily treated with a softening agent, and will be pressed into engagement with adjacent faces of the plates 34 and 30, respectively, to achieve a "plastic weld" therewith; and, if desired, the opaque lateral surfaces 33 and 37 of the posts 31 and 35 may likewise be treated with such softening agent before assembly.

After assembly, the spaces 38 between adjacent and contacting posts 31 and 35 may, if it is deemed desirable, but not necessarily, be filled with any suitable flowable material 39 which will harden in situ. Such material, if used, will preferably be tralucent, when hardened, and will preferably be of such character that its refractive value is similar to that of the material from which the plates 30 and 34 and the posts 31 and 35 are formed.

It will be noted that I have shown two forms of lenses in which the tralucent sections defined by opaque bounding surfaces are provided by interdigitating fingers or posts carried by mating plates, the posts being square in cross section in one form, and circular in cross section in the other form. At first glance, it would appear that almost any geometrical figure could be used as the cross section of the interdigitating posts; but it can be shown that only rectangular and circular cross sections are available to accomplish my intended purposes in an assembly of the character described. If the posts are given any other cross section, it will be found that, in at least some instances, adjacent or contacting posts must be common to a single plate. Such an arrangement, of course, will not lend itself to the necessity for rendering opaque the lateral surfaces of the posts.

I claim as my invention:

1. A light-rectifying lens comprising a tralucent plate having a multitude of transversely separated, parallel posts of small cross section and of a common axial length projecting from one surface thereof and arranged in a checkerboard grouping, each post being longitudinally tralucent but transversely opaque, and a second tralucent plate having a multitude of similarly transversely separated, parallel posts of similar cross section and of a common axial length projecting from one surface thereof and arranged in a complementary checkerboard grouping, each post of said second plate being longitudinally tralucent but transversely opaque, said posts of said first plate being longitudinally interdigitated with said posts of said second plate and with the first and second plates integrated by the joining of said posts and forming substantially parallel end walls of said posts and the outer surfaces of said lens.

2. The lens of claim 1 in which each post of each plate is laterally contacted at a plurality of points by a plurality of posts of the other plate.

3. The lens of claim 1 in which each post of each plate is laterally contacted, substantially throughout its length, at a plurality of perimetrally spaced regions by a plurality of posts of the other plate.

4. The lens of claim 3 in which the remote end surfaces of the posts of each plate substantially engage the other plate in regions located intermediate the bases of the posts of such other plate.

5. The lens of claim 3 in which each post of each plate has a uniform cross-sectional contour from end to end chosen from the group consisting of rectangles and circles.

6. The lens of claim 1 in which the lateral surfaces of each post are opaque, the body of each such post between said surfaces being tralucent.

GLEN A. JOHNSON.

References Cited in the file of this patent

UNITED STATES PATENTS

| Number | Name | Date |
|---|---|---|
| 531,994 | Gathmann | Jan. 1, 1895 |
| 942,589 | Salisbury | Dec. 7, 1909 |
| 1,336,951 | Fulgini et al. | Apr. 13, 1920 |
| 1,442,207 | Yardley | Jan. 16, 1923 |
| 1,561,010 | Muckenhirn | Nov. 10, 1925 |
| 1,618,010 | Hoss | Feb. 15, 1927 |
| 1,627,892 | Frederick | May 10, 1927 |
| 1,687,119 | Benson et al. | Oct. 9, 1928 |
| 1,751,584 | Hansell | Mar. 25, 1930 |
| 1,764,925 | Beach | June 17, 1930 |
| 1,979,470 | Johnston | Nov. 6, 1934 |
| 2,053,173 | Astima | Sept. 1, 1936 |
| 2,091,152 | Malpica | Aug. 24, 1937 |
| 2,289,872 | Brinkmann | July 14, 1942 |
| 2,326,012 | Dalton | Aug. 3, 1943 |
| 2,398,799 | Miller | Apr. 23, 1946 |
| 2,422,472 | Dalton | June 17, 1947 |
| 2,515,937 | Stookey | July 18, 1950 |
| 2,515,940 | Stookey | July 18, 1950 |
| 2,515,943 | Stookey | July 18, 1950 |

FOREIGN PATENTS

| Number | Country | Date |
|---|---|---|
| 400,223 | Italy | Nov. 27, 1943 |